United States Patent [19]

Nilsson

[11] Patent Number: 4,508,287

[45] Date of Patent: Apr. 2, 1985

[54] WINDING ATTACHMENT FOR SAFETY BELTS IN VEHICLES

[75] Inventor: Karl E. Nilsson, Ottobrunn, Fed. Rep. of Germany

[73] Assignee: Bayern-Chemie Gesellschaft für flugchemische Antriebe mit beschränkter Haftung, Fed. Rep. of Germany

[21] Appl. No.: 489,054

[22] Filed: Apr. 27, 1983

[30] Foreign Application Priority Data

Apr. 29, 1982 [DE] Fed. Rep. of Germany ....... 3215926

[51] Int. Cl.³ ...................... A62B 35/02; B65H 75/48
[52] U.S. Cl. .............................. 242/107; 242/107.4 R; 280/806
[58] Field of Search .......... 242/107, 107.4 R–107.4 E; 297/478, 480; 280/806

[56] References Cited

U.S. PATENT DOCUMENTS

| 4,234,209 | 11/1980 | Ikesue ............................ 280/806 X |
| 4,358,135 | 11/1982 | Tsuge et al. ........................ 280/806 |
| 4,423,846 | 1/1984 | Fohl .................................... 242/107 |

FOREIGN PATENT DOCUMENTS

| 2409159 | 9/1974 | Fed. Rep. of Germany ...... 297/480 |
| 2411702 | 9/1975 | Fed. Rep. of Germany. |

Primary Examiner—John M. Jillions

Attorney, Agent, or Firm—McGlew and Tuttle

[57] ABSTRACT

A winding attachment for passenger safety belts in vehicles comprises an automatic takeup roller over which the belt is entrained having a roller shaft and a clutch disc connected to the shaft which is rotatable in one direction to drive the shaft in a direction to cause the roller to retighten the belt. At least one cylinder having a closed end and an opposite opened end has a piston therein which is movable after ignition of a propellant charge which is contained in the cylinder and which generates a propellant gas which moves the piston in the cylinder toward the open end. A tension member has one end connected to the piston and is engaged adjacent its opposite end around the clutch disc so that when the piston is moved by the ignition of the propellant charge, the tension member causes the clutch disc to drive the takeup reel so as to tighten the seat belt. The propellant charge is advantageously arranged either inside the cylinder on one side of the piston or it is carried in the piston itself and discharges between the piston and the closed end of the cylinder. The construction also can include a winding attachment at each side of the takeup roller in the form of pistons movable in cylinders to drive the takeup roll. The piston advantageously includes a heavy material portion which is sized so as to regulate the amount in which it will move out the open end of the cylinder.

7 Claims, 5 Drawing Figures

WINDING ATTACHMENT FOR SAFETY BELTS IN VEHICLES

FIELD AND BACKGROUND OF THE INVENTION

This invention relates in general to vehicle safety devices and in particular to a new and useful device for retightening a safety belt which is held on a takeup roller.

Seat belt retighteners serve to eliminate the slack in a belt in a collision by pulling back the belt so that the free prolapse path of the seat belt until the belt becomes effective is as short as possible. Retighteners, which consist of a cylinder and a piston admitted with propellant gases are also called linear tighteners. A linear tightener can be seen, e.g. in German OS No. 24 11 702. Compared to rotary tighteners with rotary driving motors working on the rotary piston the linear tighteners have principally a simpler construction.

A winding attachment with a retightener must meet particularly three requirements. First, the retightener must be able to eliminate sufficiently large slack in the belt (e.g. 20 cm), it should be able to be accommodated in the small available space in motor vehicles, and third, it should be able to be arranged subsequently in existing standard automatic takeup rollers without, or at any rate with only minor changes.

A winding attachment using a movable piston moved by a pyrotechnic propellant gas has already been suggested. The cylinder for the piston is arranged above the automatic takeup roller and extends substantially vertically upward. The upper end of the cylinder is tapered to prevent the piston from issuing from the cylinder in case of an accident. The length of the cylinder corresponds for constructional reasons to a greater length than the slack to be eliminated and is, e.g. about 30 cm. Such a long cylinder is very difficult to accommodate in the B-column of today's automobiles. In order to make the cylinder even longer, the pyrotechnic composition is arranged in a separate housing which is axis parallel to the automatic takeup roller. Due to the arrangement of the propellant charge in a separate housing, the manufacturing costs of the known linear tightener are increased. In addition, the long cylinder tube prevents a compact construction.

SUMMARY OF THE INVENTION

The invention is based on the problem of making the above-described retightener more compact and simpler with at least the same reliability, so that it can be attached on the existing standard automatic takeup rollers with a minimum of modifications.

Apart from its small space requirement, its simple use in the various automatic takeup rollers of the various manufacturers (except for the fastening of the retightener, it is only necessary to insert an additional clutch disc in the automatic takeup roller, which is coupled with the roller shaft in an accident) and its low manufacturing costs, the retightener of the winding attachment according to the invention has the additional advantage that it can be adapted to the special requirements of the respective vehicle by a corresponding layout of the admixed material without having to change the pyrotechnical composition.

Thus the initial acceleration of the piston, and thus the load of the structure element, particularly of the tension means, is greatly reduced by a large added weight material. Besides, the weight material can take into account the various belt arrangements, which result from different belt geometries and can lead to different requirements for the tightening operation. The tension means of the winding attachment according to the invention can be a rope, a strand, a strap, a wire, a spring band steel, or a roller chain.

Accordingly, it is an object of the invention to provide a device for retightening a seat belt which includes a piston which is movable in a cylinder upon ignition of a propellant charge and which carries a tension member which is connected to the takeup roller so as to drive the roller in a direction to tighten the seat belt.

A further object of the invention is to provide a winding attachment for tightening seat belts during emergencies which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
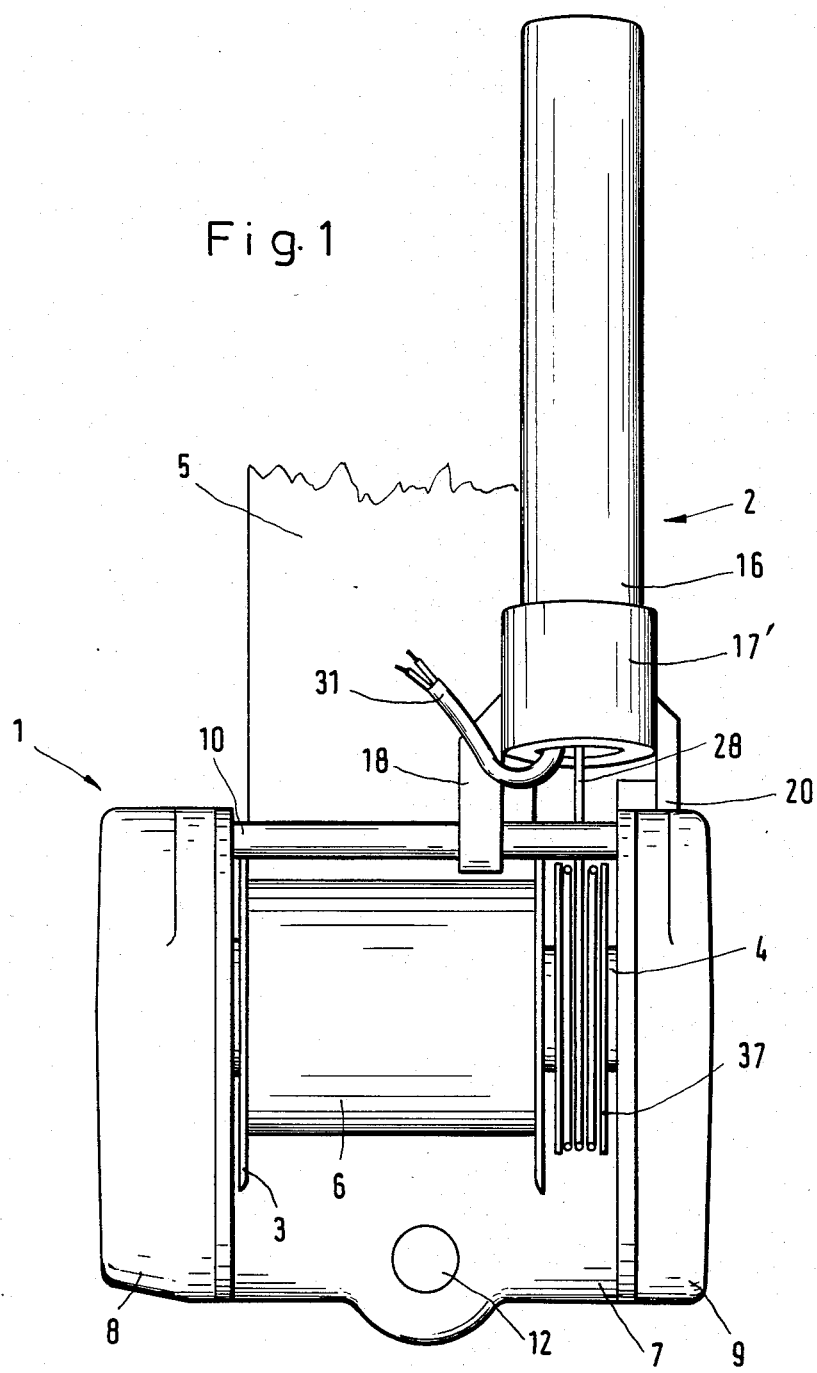
FIG. 1 is a front elevational view of a winding attachment constructed in accordance with the invention.

Referring to the drawings in particular the invention embodied therein comprises a winding attachment for a seat belt retightener generally designated 2 for retightening passenger safety belts in vehicles and which is usable with an automatic takeup roller 1 having a reel or roll 3 over which the belt is trained and having roller shaft 4 which may be rotatable by the action of a clutch disc 37 which is connected to the shaft and which drives the shaft in a direction to cause the roller to retighten a seat belt. The retightening device includes at least one cylinder 16 having a closed end and an opposite open end with a piston 22 movable in the cylinder upon ignition of a propellant charge 29. The propellant charge 29 generates a propellant gas to cause movement of the piston 22 toward the open end of the cylinder 16. A tension member or rope 28 is connected to the piston 22 and it has an opposite end which is engaged with the clutch disc 37. When the piston is moved the clutch disc is rotated to rotate the roll 6 in the direction to cause tightening of the seat belt.

Figure 2:
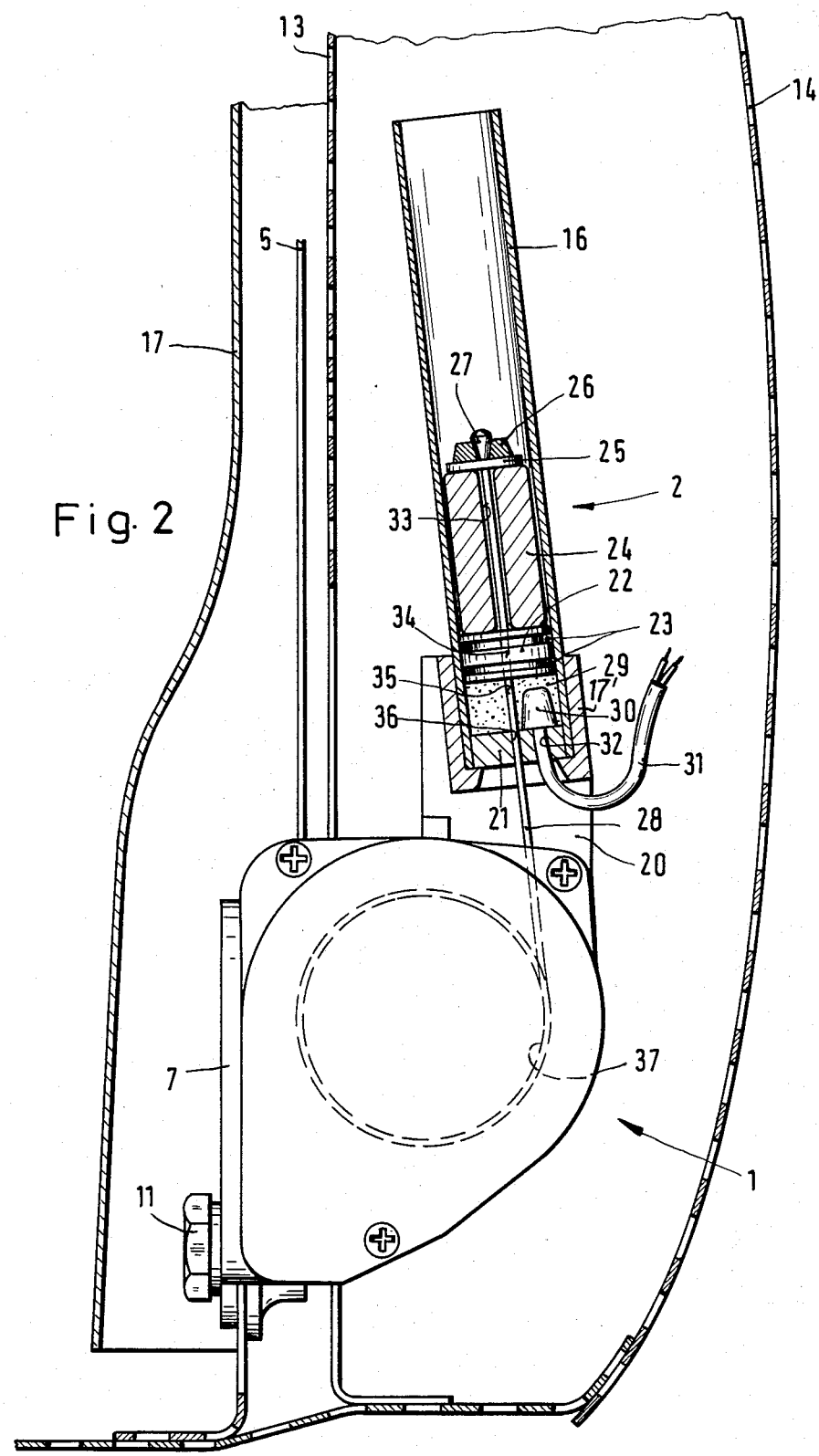
FIG. 2 is a sectional view of the device shown in FIG. 1.

The winding attachment according to the invention comprises according to FIGS. 1 and 2 an automatic takeup roller 1 with an attached retightener 2.

The automatic takeup roller is one of the standard types used today, That is, a belt strap is wound on belt strap spool 3 on shaft 4 in roll 6. Roller shaft 4 is rotatably mounted in a housing 7 with a plate-shaped rear wall. For covering the blocking mechanism, as well as the winding spring of the automatic takeup roller 1, a cap 8 or 9 is provided on both sides of belt strap spool 3, which is secured on housing 7. Between caps 8 and 9 extends above belt strap spool 3 a spacer bar 10 secured on housing 7.

The automatic takeup roller 1 is secured by means of a bolt 11, which passes through a bore 12 at the bottom end of the plate-shaped rear wall of housing 7, on inner plate 13 of the B-column of the automobile. The outer plate of the B-column of the automobile is designated with 14 in FIG. 2. Belt strap 5 extends from roll 6 away at first between inner plate 13 and a covering 17 in the B-column.

Retightener 2 has according to FIGS. 1 and 2 a cylinder or a cylinder tube 16. For fastening on the automatic takeup roller 1, cylinder tube 16 is inserted with its bottom end into a fastening socket. Fastening socket has two legs 18 and 20. The axial inner leg 18 is secured on spacer bar 10 and the axially outer leg 20 on housing 7. Cylinder tube 16 is tipped slightly to the rear about the axis of spacer bar 10, that is, toward belt strap 5.

Cylinder tube 16 has a constant inside diameter. It is open at the top and closed at the bottom by a bottom or a fixedly inserted bottom piece 21.

In cylinder tube 16 is displaceably guided piston 22 which is sealed by two gaskets 23 from the inner wall of cylinder tube 16, and which has an added weight material 24 on its side remote of the open end of cylinder tube 16, whose function will be described below.

On material 24 rests a disc 25 and a cone supporting ring 26 in which is inserted a clamping piece 27. Pinched by clamping piece 27 is the free end of a rope 28 for example, which serves as a tension means.

Between bottom piece 21 and piston 22 is arranged in cylinder tube 16 a propellant or pyrotechnical charge 29 with a fuse 30. An ignition wire 31 extends from fuse 30 through a bore 32 in bottom piece 21 to the outside.

The rope of the force transmission element 28 extends through a central bore 33 in the material 24, a central fitting bore 34 in piston 22, a central bore 35 in propellant charge 29, and through a central fitting bore 36 in bottom piece 21 to the outside to clutch disc 37.

As it can be seen from FIG. 1, rope 28 is wound around clutch disc 37. Between clutch disc 37 and shaft 4 of automatic takeup roller 1 is provided a driver clutch which has the effect that, when rope 28 is removed from clutch disc 37, hence after propellant charge 29 has been ignited, clutch disc 37 is coupled with shaft 4 of the automatic takeup roller. Any driver clutch can be used in practice, so that it is not necessary to describe its design in detail.

Figure 3:
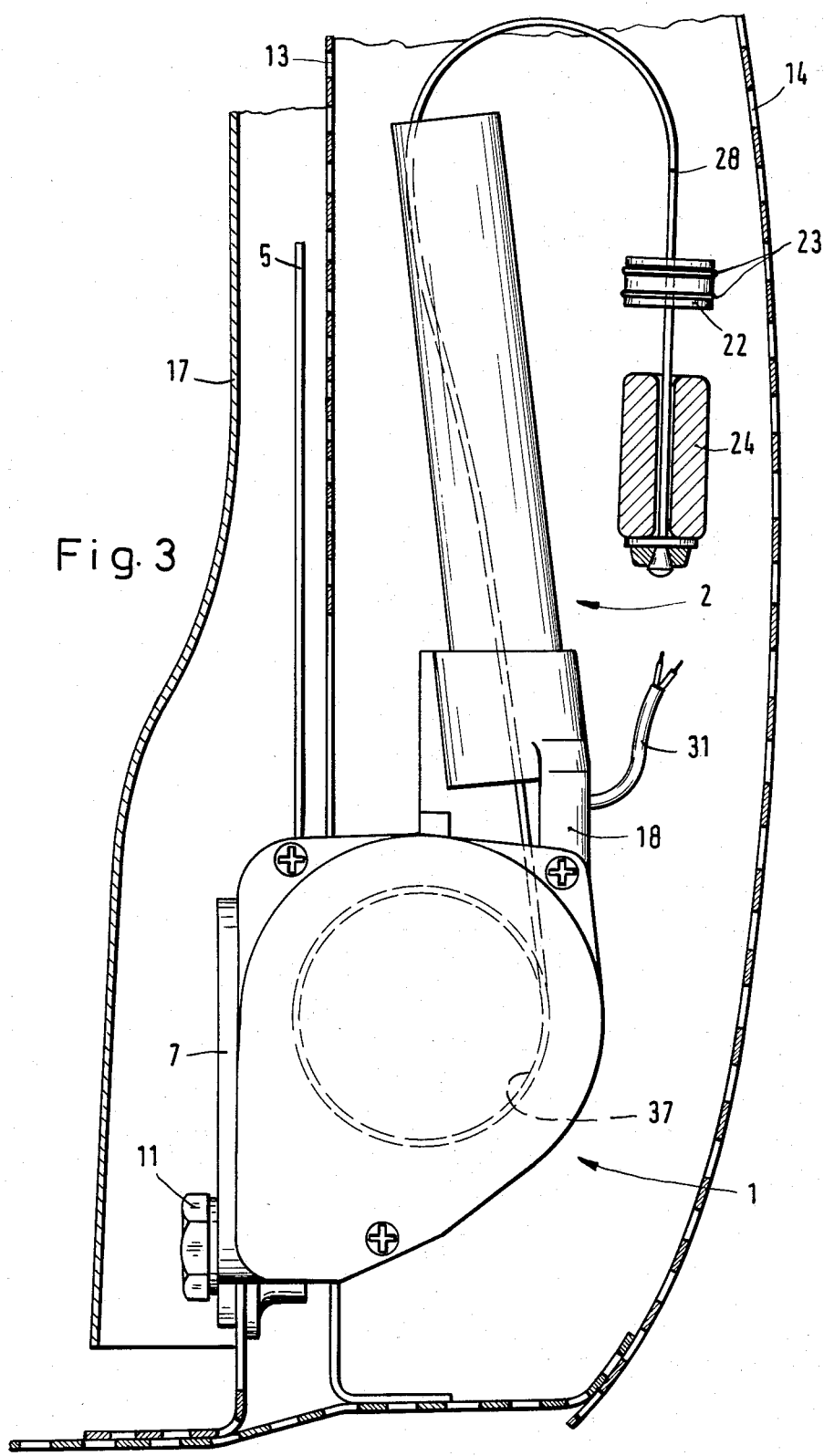
FIG. 3 is a view similar to FIG. 2 showing the apparatus after ignition of the propellant charge.

As can be seen from FIG. 3, piston 22 with added weight material 24 is ejected from cylinder tube 16 after propellant charge 29 has been ignited, that is, piston 22 and weight 24 covering it, move through a path which is greater than the length of cylinder tube 16. This path should be at least so long that all three windings of rope 28 are unwound from clutch disc 37, which can be achieved, e.g. by a corresponding length of cylinder tube 16 or by a corresponding layout of weight 24.

The function of the winding attachment according to the invention is described on the basis of an embodiment according to FIGS. 1 to 3.

In an accident, a sensor, not shown, identifies the severity of the accident and transmits, when a determined threshold is exceeded, an ignition pulse over ignition wire 31 to fuse 30. The propellant charge 29 burns off and the propellant gases expand in a pulse. Piston 22 with the attached weight 24 is accelerated in cylinder tube 16. With piston 22 also moves rope 28, which manifests itself in a rotation of clutch disc 37 of the driver clutch. After a few degrees of rotation of clutch disc 37, shaft 4 is coupled by the driver clutch and is carried along. The driver clutch thus represents a continuous connection between the piston 22, and belt strap 5 to be pulled or wound. When piston 22 leaves the top edge of cylinder 16, the drive from the expansion of the propellant gas is completed.

In the case of a very great slack, the path of piston 22 covered so far, which corresponds substantially to the length of the cylinder tube may no longer be sufficient. This is where the action of the weight 24 sets in, which has absorbed a great amount of kinetic energy on the acceleration path in cylinder tube 16. It acts now as a flywheel and shoots further upward so that the pulling or winding of the belt strap (tightening process) is continued.

When the rising force of belt strap 5 and the force from the energy content of the moving masses (also the rotary energy of shaft 4 of the takeup roller 1 and of clutch disc 37 of the driver clutch) are in equilibrium, the tightening process is completed.

The now possible removal of belt strap 5 in the direction of force is prevented by the normal blocking of the automatic takeup roller 1 which also has to absorb the now onsetting crash load from the forward position of the passengers.

Retightener 2 is logically so arranged in the vehicle that it is in a protracted (encapsuled) space. On the one hand, weight 24 acts like a projectile and, on the other hand, the issuing propellant gases can damage belt strap 5. In the embodiment shown in FIGS. 1 to 3, inner plate 13 of the B-column acts as a protective plate.

It can be seen that the length of cylinder tube 16 can be kept small in the winding attachment according to the invention. Besides, retightener 2 extends upward where there is normally the most room in the B-column of the automobile. The modification of the automatic takeup roller are limited to the installation of clutch disc 37 of the driver clutch. Accordingly, the winding attachment is only increased in axial direction by the width of clutch disc 37. The added weight 24 consists preferably of a heavy metal, e.g. of lead. Piston 22 and weight 24 can also be formed of one piece.

Figure 4:
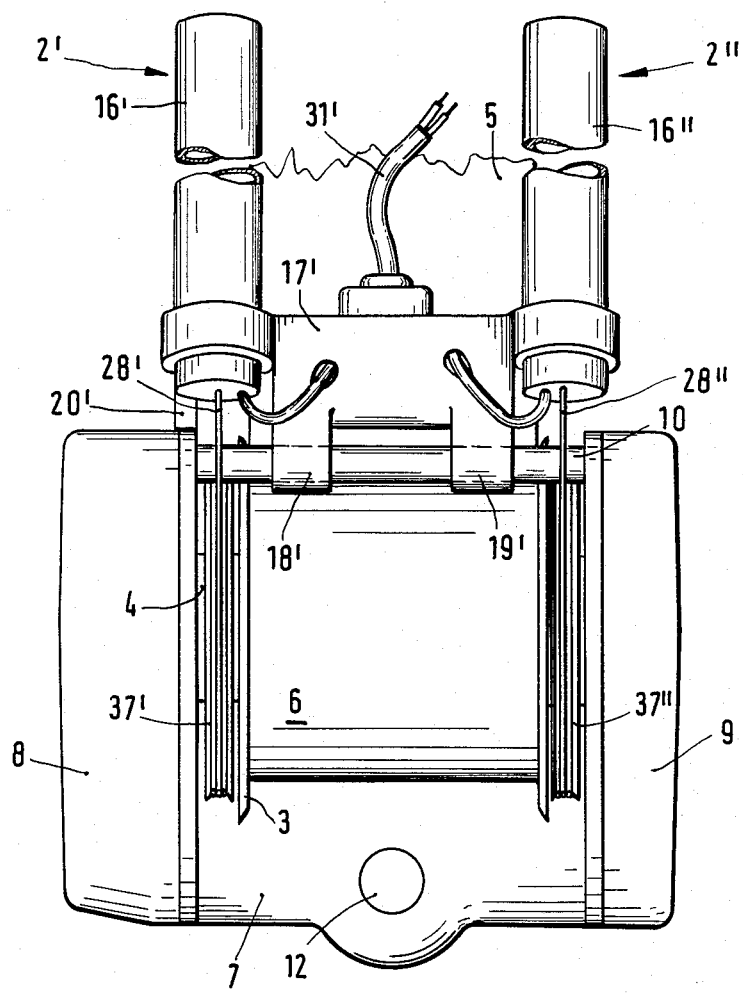
FIG. 4 is a view similar to FIG. 1 of another embodiment of the invention.

The embodiment of the winding attachment presented in FIG. 4 differs from that according to FIGS. 1 to 3 substantially in that two retighteners 3' and 2" are provided whose force transmitting elements 28', 28" are wound each on one clutch disc 37', 37" of a driver clutch. The two clutch discs 37' and 37" are arranged at both sides of belt strap spool 3 on shaft 4 of the automatic takeup roller 1. Cylinder tubes 16' and 16" are inserted into a fastening socket 17', which has three legs 18', 19' and 20', the two legs 18' and 19' remote of belt strap 5 bearing above the axis of roller shaft 4 on housing 7 of the automatic takeup roller 1. The ignition wire 31' has a branch each to the fuses of retighteners 2' and 2".

The embodiment according to FIG. 4 with the two symmetrically arranged retighteners 2' and 2" is of particular advantage when relatively larger belt strap winding forces are used over force-transmitting forces, which must be kept relatively thin for flexibility reasons. The weight can be formed in this embodiment exclusively by the two pistons of retighteners 2' and 2".

Figure 5:
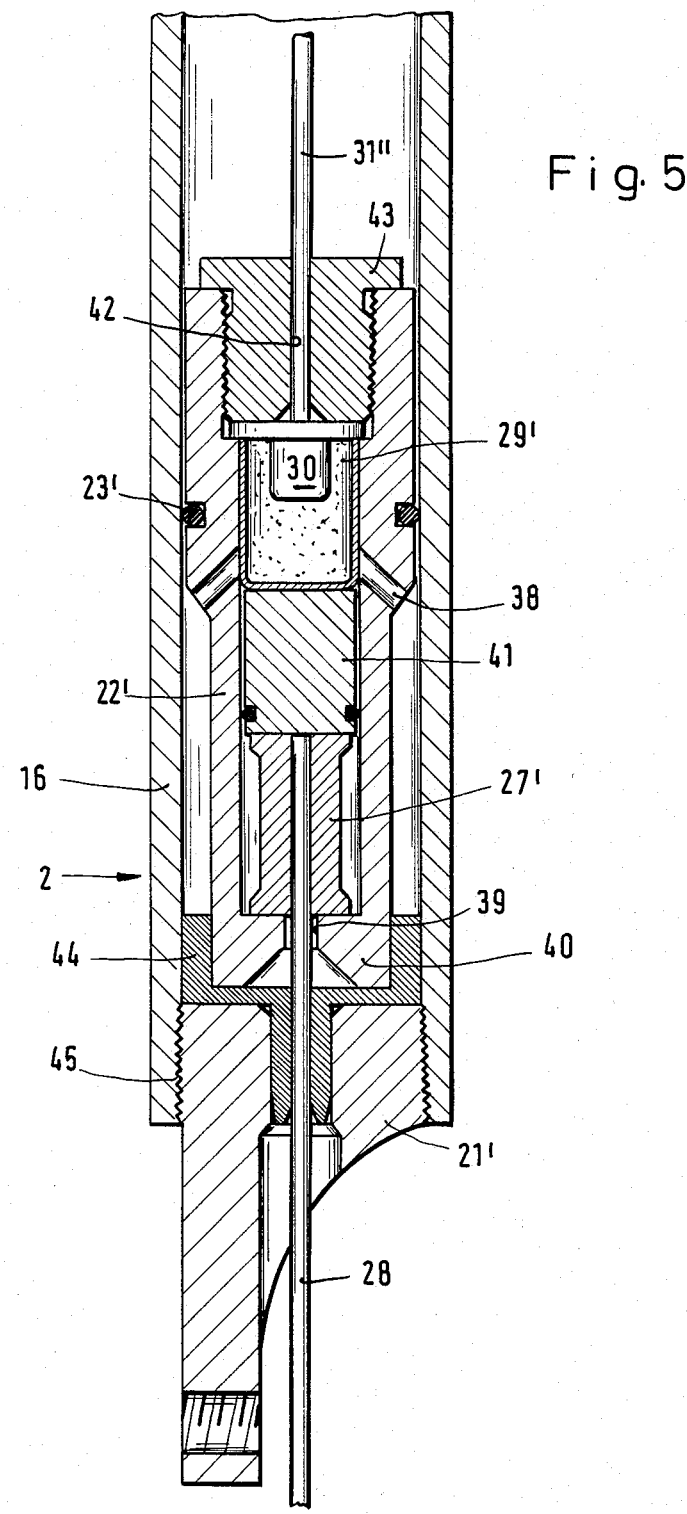
FIG. 5 is a sectional view of another embodiment of the belt tightener.

The embodiment of the retightener shown in FIG. 5 differs from that according to FIGS. 1 to 3 substantially in that the propellant charge 29' is arranged in piston 22'. Propellant charge 29' thus forms at least a part of the weight.

Furthermore, outlet bores 38 are provided in piston 22 between propellant charge 29' and the side of piston 22' facing bottom piece 21'. Clamping piece 27', which is secured on the free end of the rope or force transmission element 28, is held by bottom 40 of the hollow piston 22' whereby rope 28 extends through a central bore 39 in piston bottom 40. A disc 41, which can be designed as an added weight, seals propellant charge 29' from rope 29. Ignition wire 31" is guided through a bore 42 in a plug 43 secured on its side facing the open end of cylinder tube 16. It issues from cylinder tube 16 over its upper free opening.

Furthermore, a seal 44 is arranged on the bottom piece or cylinder bottom 21', which seals the bore for the tension means 28 in cylinder bottom 21' from the outside. At the same time seal 44 seals a thread 45 provided between cylinder bottom 21' and cylinder 16. Seal 44 also holds piston 22' in its initial position. Finally seal 44 serves as an active surface for the propellant gases at the start of the piston stroke.

The tension means 28, 28', 28" are preferably provided with a plastic coat which melts when propellant charge 28, 29' burns off, thus protecting tension means 28, 28', 28" and their core respectively, in the sense of an ablative layer against excessive heating.

While specific embodiments of the invention have been shown and described in detail to illustrate the application of the principles of the invention, it will be understood that the invention may be embodied otherwise without departing from such principles.

What is claimed is:

1. A winding attachment for passenger safety belts in vehicles, comprising an automatic takeup roller over which the belt is entrained, a roller shaft connected to said takeup roller for rotation therewith, and at least one clutch disc connected to said shaft and being rotatable to drive said shaft in a direction to cause the roller to rotate and retighten the seat belt, at least one cylinder having a closed end and an opposite end, a piston movable in said cylinder, a pyrotechnical charge in said cylinder, means for igniting said charge to generate propellant gases to move said piston toward and out of the open end of said cylinder, a tension member having one end connected to said piston and being engaged around said clutch disc, said piston being movable with said tension member to cause said clutch to drive said takeup roll in a direction to tighten the seat belt, and an additional weight of a size selected in accordance with the kinetic energy necessary to tighten the seat belt connected to said piston for movement with said piston out of said cylinder open end, the length of the cylinder being selected so that the piston and weight will leave the cylinder when the charge is ignited.

2. A winding attachment according to claim 1, wherein said charge is arranged within said cylinder adjacent the closed end, said closed end being oriented downwardly with the open end extending upwardly.

3. A winding attachment according to claim 2, wherein said charge is carried within said piston, said piston being of a size, including said propellant charge and said weight, to travel out of said cylinder when said charge is ignited.

4. A winding attachment according to claim 3, wherein said piston has outlet bores for the propellant gas between an end thereof and the closed end of said cylinder.

5. A winding attachment according to claim 3, including an igniting device for the propellant charge extending into said cylinder from the open end thereof.

6. A winding attachment according to claim 1, wherein said cylinder has a constant interior diameter.

7. A winding attachment according to claim 1, including a takeup roller housing rotatably supporting said takeup roller and its associated shaft for rotation about a horizontal axis, means for mounting said housing in a vehicle so that the belt strap may be fed alongside a wall of said vehicle, said winding attachment being mounted on said takeup roller on the opposite side of said wall, said at least one cylinder extending on the opposite side of said wall from said seat belt.

* * * * *